E. H. ELDER.
GUN BARREL RIFLING MACHINE.
APPLICATION FILED JULY 8, 1915.
1,211,119.
Patented Jan. 2, 1917.
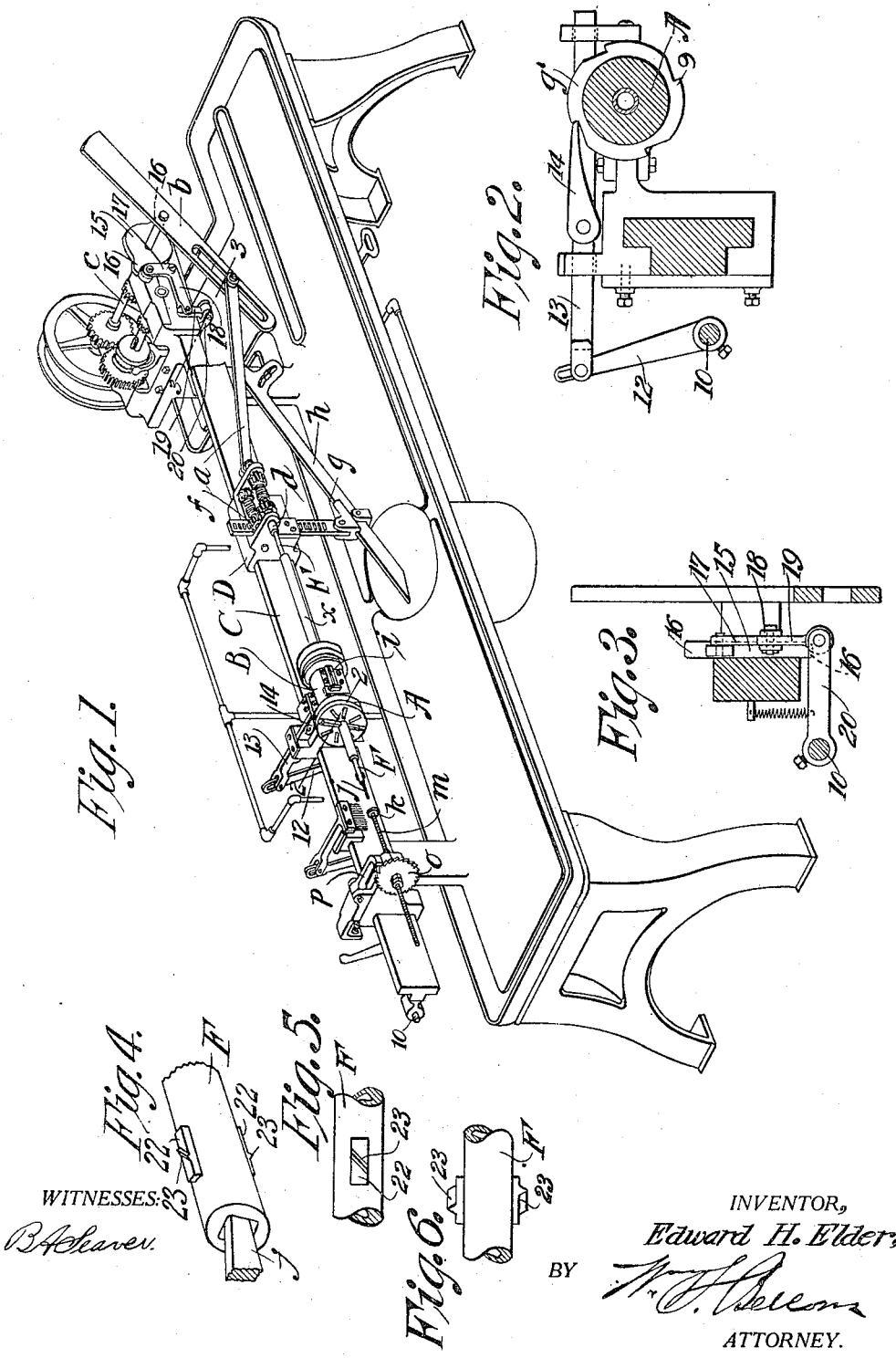
WITNESSES:
B. A. Shaver.
INVENTOR,
Edward H. Elder,
BY
ATTORNEY.

UNITED STATES PATENT OFFICE.

EDWARD H. ELDER, OF CHICOPEE, MASSACHUSETTS.

GUN-BARREL-RIFLING MACHINE.

1,211,119.  Specification of Letters Patent.  Patented Jan. 2, 1917.

Application filed July 8, 1915. Serial No. 38,770.

*To all whom it may concern:*

Be it known that I, EDWARD H. ELDER, a citizen of the United States of America, and resident of Chicopee, in the county of Hampden and State of Massachusetts, have invented certain new and useful Improvements in Gun-Barrel-Rifling Machines, of which the following is a full, clear, and exact description.

The object of this invention is to so improve a gun barrel rifling machine that it is capable of operation with much less loss or waste of time than usual heretofore and with a consequent large increase of production or amount of work performed.

The machine of the class to which this invention relates is one comprising a chuck for the barrel, mounted for rotative movement, a rifling rod having a tool for cutting the groove or lands spirally in the barrel and having a carrier and means for imparting reciprocatory movement to such carrier so that the rifling rod is moved through the barrel to cut the groove in one direction of the travel, the carrier reversing to withdraw the rifling rod, means for imparting a rotative movement to the chuck at the end of every back and forth stroke, and means for imparting revoluble movement to the rifling tool so that its radially projected cutter will be effective for imparting a gradual spirality to the groove.

In the rifling operation a large number of passes or cuts must be successively made before the lands is produced of the requisite depth; and in the machine on which this invention is an improvement and as heretofore constructed and used there is a very large proportion of the time of the operation of the machine lost, or in which no cutting effect is produced, because, as manifest, in the retracement of the tool through the barrel in the return direction the cutter is inactive or ineffective for the progression of the rifling operation.

Now in the present improved machine it is so organized that the tool makes its cut for one spiral groove in the barrel on its forward stroke, the barrel in the chuck is then partially rotated so that a cut for another spiral groove will be made along another helical line in the barrel, and so on, the barrel being partially rotated at the reversals of both the forward and backward strokes so that there is no loss of working action on the retracement of the tool as was in the case of the machine as heretofore known and employed and hereinabove explained.

The invention is described in conjunction with the accompanying drawings and is set forth in the claims.

In the drawings:—Figure 1 is a perspective view of a rifling machine in which the present improvements are embodied. Figs. 2 and 3 are partial cross sectional views on lines 2—2 and 3—3, Fig. 1. Figs. 4, 5 and 6 are views showing an example of a double acting tool suitable to be used in this improved machine.

Referring to the drawings, A represents a double axially horizontal and longitudinally arranged chuck for holding the gun barrel $x$ at two points along the length thereof, said chuck being mounted so that it may rotate in a holder B therefor mounted on a suitable supporting part, such as the long rail or bar C comprised as a part of the machine frame.

D represents a carrier for the rifling rod F, such carrier being mounted for a sliding longitudinal movement forward and backward on the aforementioned rail or bar C.

The longitudinal reciprocatory movement of the rifling rod carrier is imparted through means of the link $a$ connected with the revoluble crank $b$ carried on a rotative shaft $c$ suitably driven.

The rifling rod is carried in a holder $d$ mounted in the carrier D, to which holder $d$, revoluble movement is imparted first in one direction as the rifling rod is forwardly moved and then in the reverse direction as the rifling rod has its retracting movement by mechanism heretofore known and employed and including gearing $f$, a rack bar $g$ coacting with one of the gears and an incline $h$ with which the rack bar coacts as it is bodily moved with the carrier D, so that the cutting tool will have a revoluble movement in the gun barrel for its spiral course therein; and it is not deemed herein desirable or necessary to more fully describe and explain the mechanism for imparting rotative movement to the reciprocatingly acting rifling rod.

The chuck has a ratchet wheel $g^1$ thereon with teeth set at quarters (if the barrel is to be rifled with four lands, or a different number in cases where a different number of lands are to be cut).

Alongside and to the rear of the bar or rail is a rockshaft 10, the same having an upwardly extending arm 12 connected with the pawl carrier 13 which is provided with a pawl 14 coacting with the ratchet teeth 9 of the chuck and operative on each oscillation of the rockshaft to turn the chuck and gun barrel therein a quarter way around.

A locking or indexing device for the chuck (not of new character) is indicated at $i$.

Upon the rotative shaft $c$ on which is carried the aforementioned crank $b$ comprised in the actuating motion for the rifling rod carrier D, is a cam 15 having double, and diametrically opposite noses or protuberances 16, 16, adjusted or timed properly relatively to the crank $b$.

The cam coacts with the arm 17 of the pivotally mounted angle lever, and with the other arm 18 of this angle lever a link 19 has connection, and such link also has connection with the lever arm 20 affixed on and forwardly and more or less nearly horizontally projecting from the rockshaft 10.

As will be perceived on an inspection of the drawings in conjunction with the foregoing description, the throw of the crank $b$ in one direction will move the rifling rod forwardly through the gun barrel while the movement of the crank in the other direction will return the rifling rod and withdraw it from within the barrel; and in conjunction with these actions the double nosed cam and angle lever linked to the arm of the rockshaft 10 will effect a rocking of such shaft and thereby, through the lever 12, pawl carrier and pawl 13 and 14, effect partial rotative movements of the chuck and barrel at reversals of the strokes.

The machine is equipped with mechanism acting in conjunction with the cutter so that the cutter duplicated at opposite sides of the end portion of the rifling rod will be slightly increasingly outwardly projected at the end of each forward stroke of the carrier D and rifling rod F.

As an expedient for the distension of the cutters indicated at 22 (not new with me) is a projecting or distending device comprising a wedge $j$ which coacts with an abutment $k$ carried on a feed rod $m$ actuated through pawl and ratchet mechanism $p$ and $o$; and which, comprising no novelty herein, will not be further described.

The duplicated cutter or rifling tools as represented in Figs. 4 and 5 are made double acting or oppositely operable, that is they are formed with a sharp rib 23 which is oblique to the length of the rod on an angle of 45 degrees so as to be as effective for cutting in the rearward or returning motion as in the forward motion.

In the employment of the machine with the barrel set up in the chuck, the tools or cutters 22 will be radially inwardly retracted so as to be free and clear of the wall of the bore of the cutter, and then by running the machine on manual power the rifling rod will be projected through the barrel to emerge at the forward end thereof. The cutters will then be adjusted in their proper distension for the first cut and then the machine will be started and run on power. On the rearward stroke of the rifling rod the double and diametrically opposite spiral cuts will be made in the barrel for the partial formation of two of the lands; on the termination of the rearward stroke the rockshaft will be oscillated for effecting the quarter turn of the chuck and barrel so that on the forward stroke two more, and diametrically opposite cuts will be made relatively intermediate of those made on the aforementioned backward stroke. Now at the end of the forward stroke, through the mechanism comprising the double nosed cam, the chuck will again receive a quarter revolution to bring the cuts made on the previous backward stroke in conjunction with the grooved tools of the rifling bar; also at the end of the forward stroke the cutters will have imparted thereto a slightly increasing degree of radial distension so that on the reversing or rearward movement they will take slightly deeper into the wall of the barrel along the line previously cut on the corresponding stroke. Each rearward stroke is effective in the formation of the same given two of the lands, and each forward stroke is effective in the formation of the same given two of the lands which are relatively intermediate of the ones produced during the rearward strokes or passes.

The machine, therefore, is one in which the lands cutting operation is performed on both the forward and rearward passes, and there is not the loss of time and lack of production as was heretofore the case in the use of rifling machines as heretofore made.

I claim:—

1. In a gun barrel rifling machine, in combination, a chuck for the barrel, mounted for a rotative movement, and provided with a ratchet wheel, a rifling device comprising a rod and an oppositely operable cutting tool arranged longitudinally relatively to the axis of the chuck, and means for imparting a reciprocatory movement to the rifling device relatively to the chuck, a rock shaft, parallel with the length of the chuck and rifling rod, having an arm, a pawl-carrier carried thereby, provided with a pawl coacting with the ratchet wheel of the chuck, and means for imparting rocking movements to said shaft concurrently with the reversals of the strokes of the rifling device.

2. In a gun barrel rifling machine, in combination, a chuck for the barrel, mounted for rotative movement, and provided with a ratchet wheel, a rifling device comprising a rod and a reversely operable cutting tool arranged longitudinally relatively to the axis of the chuck, and a carrier for the rifling rod longitudinally movable relatively to the chuck, a rockshaft, parallel with the length of the chuck and rifling rod, having an arm provided with a pawl carrier, and a pawl on the carrier coacting with the ratchet wheel of the chuck,—said rockshaft having another arm thereon, a rotative shaft having a crank and a link connecting same with the carrier for the rifling rod for reciprocating such carrier, a double nosed cam on said rotative shaft, a lever with which said double nosed cam coacts and which is connected with the second named arm of the rockshaft whereby said shaft will have rocking movements concurrently with the reversal of the movements of the rifling rod carrier.

Signed by me at Springfield, Mass., in presence of two subscribing witnesses.

EDWARD H. ELDER.

Witnesses:
WM. S. BELLOWS,
G. R. DRISCOLL.

Copies of this patent may be obtained for five cents each, by addressing the "Commissioner of Patents, Washington, D. C."